(12) United States Patent
Twerdun

(10) Patent No.: US 6,171,356 B1
(45) Date of Patent: Jan. 9, 2001

(54) CYCLONIC VACUUM GENERATOR APPARATUS AND METHOD

(76) Inventor: Frank Twerdun, 722 Clarke Road, Coquitlam, British Columbia (CA), V3J 3Y1

( * ) Notice: Under 35 U.S.C. 154(b), the term of this patent shall be extended for 0 days.

(21) Appl. No.: 09/069,068

(22) Filed: Apr. 28, 1998

(51) Int. Cl.$^7$ .................................................. B01D 45/12
(52) U.S. Cl. ........................... 55/337; 55/418; 55/459.1; 55/DIG. 3; 15/347; 15/350; 15/353
(58) Field of Search .................... 55/337, 459.1, 55/418, DIG. 3; 95/272; 15/347, 350, 353

(56) References Cited

U.S. PATENT DOCUMENTS

| | | |
|---|---|---|
| 4,643,748 | 2/1987 | Dyson . |
| 5,062,870 * | 11/1991 | Dyson .............................. 55/DIG. 3 |
| 5,078,761 * | 1/1992 | Dyson .............................. 55/DIG. 3 |
| 5,080,697 | 1/1992 | Finke . |
| 5,090,976 * | 2/1992 | Dyson .............................. 55/DIG. 3 |
| 5,135,552 | 8/1992 | Weistra . |
| 5,145,499 | 9/1992 | Dyson . |
| 5,259,854 * | 11/1993 | Newman ........................... 55/DIG. 3 |
| 5,267,371 | 12/1993 | Soler et al. . |
| 5,307,538 | 5/1994 | Rench et al. . |
| 5,779,745 * | 7/1998 | Kilstrom ........................... 55/DIG. 3 |

OTHER PUBLICATIONS

"Typical Flannel Bag Type Filter". 1 page document labelled Attachment A.
"Vacuflo System". 2 page document labelled Attachment B.
"Central Vaccum Supersystem". 2 page document labelled Attachment C.

* cited by examiner

Primary Examiner—David A. Simmons
Assistant Examiner—Minh-Chau T. Pham

(57) ABSTRACT

Method and apparatus for creating a cyclonic action within a cannister. Communication of air between a first truncated conical member with a hole or opening located in its central area and the inside of the lower casing of the cannister takes place using an annulus between the outside of the conical member or, alternatively, by using holes or openings extending through the conical member. Transition areas create lower pressure areas which attract debris laden air downwardly so as to deposit the debris in the lower pressure area of the cannister.

10 Claims, 4 Drawing Sheets

CYCLONIC VACUUM GENERATOR APPARATUS AND METHOD

INTRODUCTION

This invention relates to a cyclonic air flow generator and, more particularly, to a central vacuum cyclonic generator used in residential and commercial establishments which may have a plurality of inlets used for attaching a vacuum hose.

BACKGROUND OF THE INVENTION

There are a variety of central vacuum generators in the marketplace which are used to generate a vacuum to which a hose can be attached and which then acts to create a suction in the hose so that debris in the form of dust, dirt and the like can be suctioned into the hose and thence into the generator where it is deposited and remains. After a certain period when the cannister operable connected to the central vacuum generator is full, the cannister is removed and the accumulated debris is dumped from the cannister. A typical one of such canisters and central vacuum generators is one made by Hayden.

The Hayden device uses a centrally positioned cone within the cannister and located below a cartridge filter. The vacuum is created by a motor driving a two(2) or three(3) stage utility impeller. The debris entering the cannister though the inlet to the cannister from the attached hose is intended to spin about the inside of the cone from the upper to the lower portion which is open because the cone is truncated. The debris is then deposited in the central portion of the cannister cone directly below the cone opening.

The problem with such canisters is that the technique for creating low and high pressure zones within the canister is not well understood with the result that efforts made to enhance the vacuum and deposit the debris properly in the cannister are unsatisfactory. The known techniques result in inefficient vacuuming action. Specifically, little of the debris deposited within the canister takes full advantage of the vortex rings created by the configuration of the Haydon apparatus.

SUMMARY OF THE INVENTION

According to one aspect of the invention, there is provided a cyclone generator for a central vacuum system comprising a first cone within which debris received from ambient surroundings is circulated, a first opening between said first cone and the outside of said first cone to allow communication of air between said first cone and a lower casing of a cannister in which said first cone is positioned, a second opening separate from said first opening and allowing communication of air from said central portion of said lower casing of said cannister upwardly and into a suction generator positioned in the central area of said cyclone generator above said first cone.

According to a further aspect of the invention, there is provided a method of creating cyclonic air flow within a cannister comprising initiating a suction within said cannister, allowing said suction to suck air into said cannister through an inlet, circulating said air in said cannister around a first conical member, and allowing communication of said air between said first conical member and the inside of said cannister.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 1:
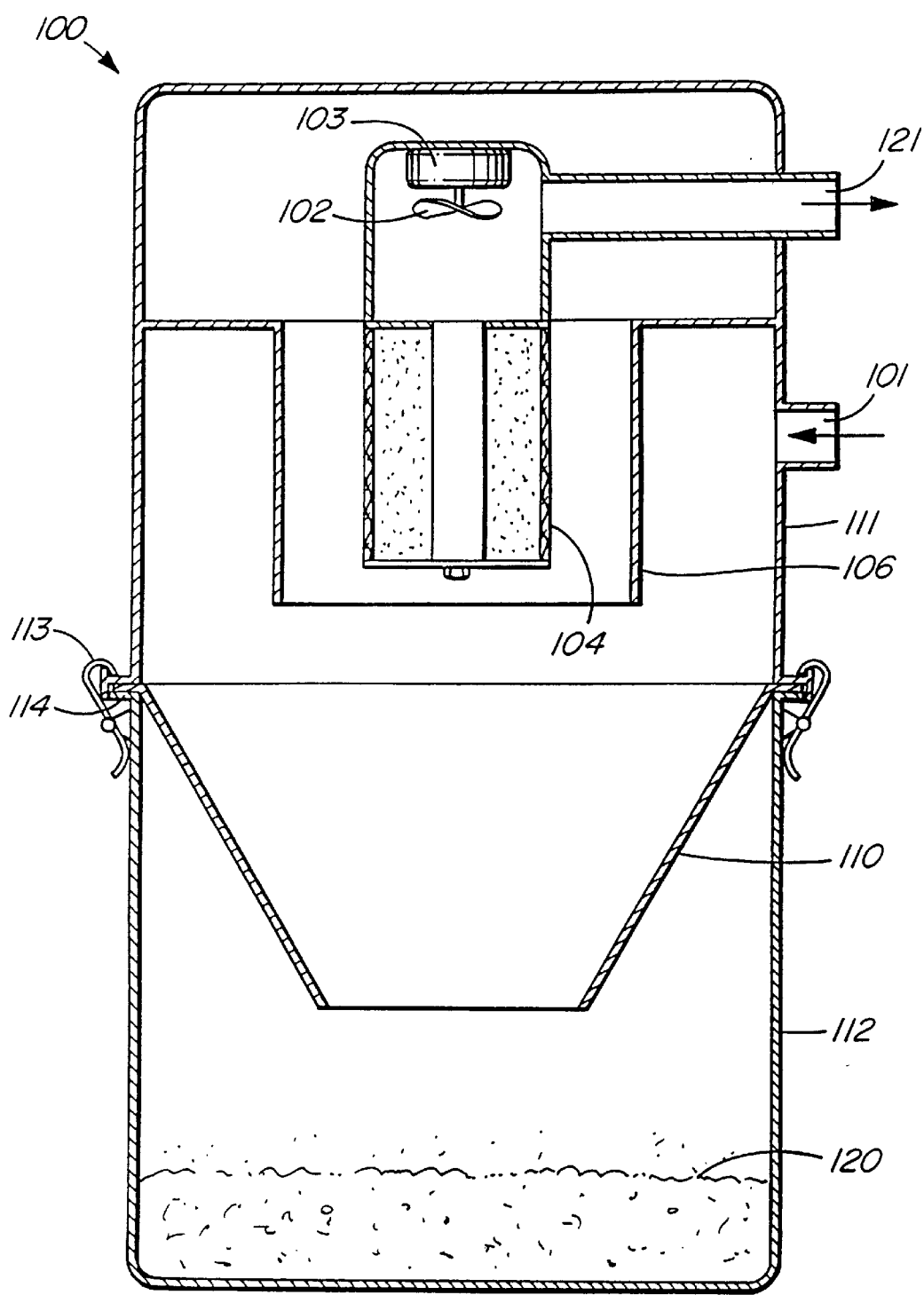
FIG. 1 is a cross-sectional diagrammatic view of a central cyclonic generator according to the prior art.

Referring now to the drawings, a cyclonic generator and its associated vacuum system according to the prior art is generally illustrated at 100 in FIG. 1. It comprises an air inlet 101 which is typically connected to a suction hose (not illustrated) through which debris and other particles are vacuumed into the system 100. A motor 103 is connected to an impeller type fan 102 which provides suction and initiates the air flow within the cyclonic generator 100. An air filter of cylindrical configuration 104 is positioned above a truncated open-bottomed cone 110 and provides for removal of any remaining debris from the circulating air within the cyclonic generator 100 prior to air exit. The cone 110, filter 104, motor 103 and fan 102 are mounted within a casing having an upper cylindrical member 111 which is connected to a lower cylindrical member 112 using two(2) turnbuckles 113 located equidistant around the circumference of the members 111, 112. The cone 110 is removably mounted in a sealing engagement with an outer lip 114 in the lower member 112.

In operation in the known cyclonic generator 100, air flow enters the inlet 101 and swirls around the outside of the filter shroud 106. This air then moves downwardly in a spiral motion and enters truncated cone 110. As the speed of the whirling air increases due to the decrease in size of the diameter of the cone 110, it is intended that the debris within the air will pass through the bottom of the cone 110 and accumulate in the bottom of the lower casing member 112 in area 120. The air flow then rises due to the suction provided by impeller 102 and passes through the outside of the air filter 104 into the central area, thence into the impeller 102 and out of exhaust 121, all as is shown by the arrows in FIG. 1.

Figure 2:
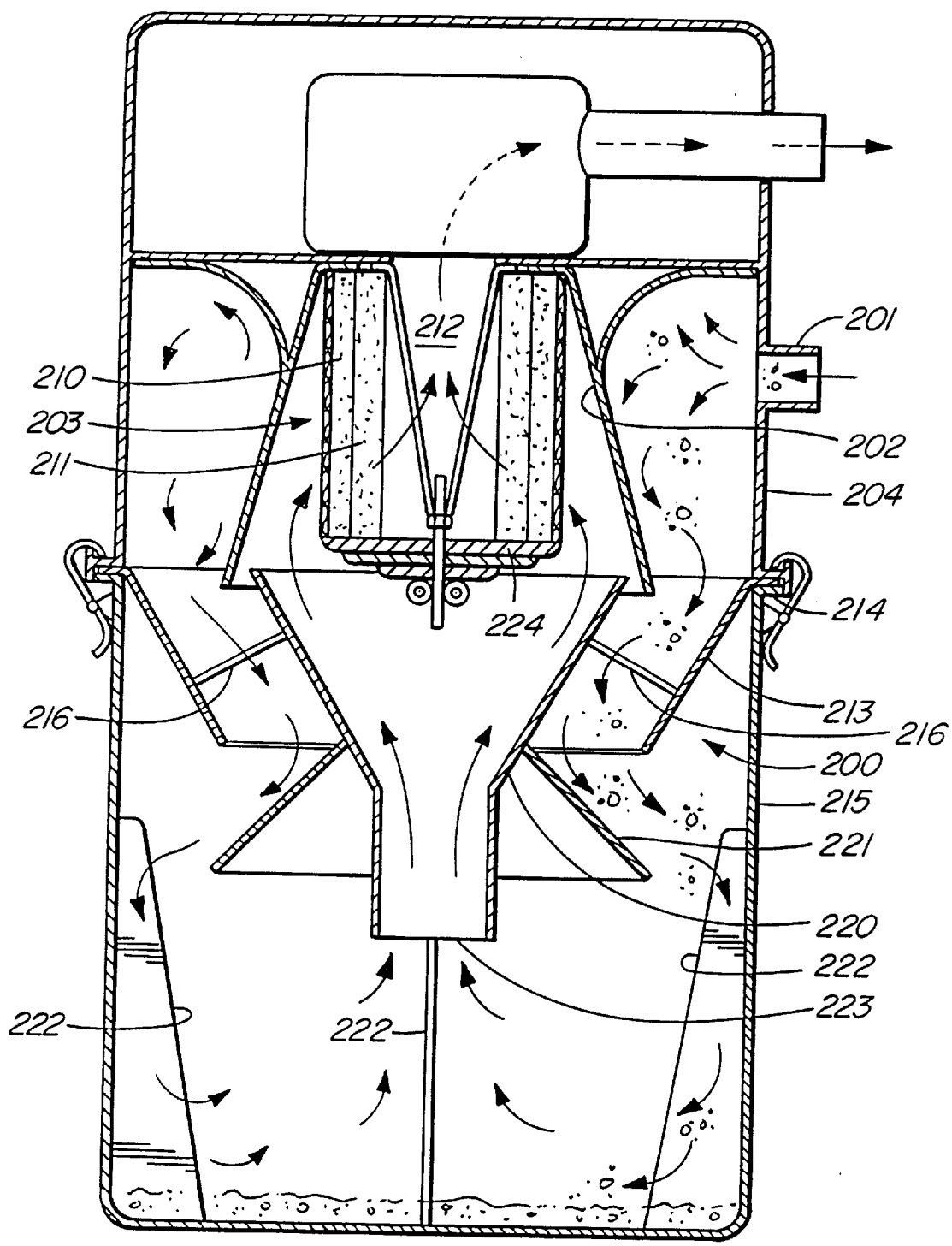
FIG. 2 is a diagrammatic cross-sectional view of the central cyclonic generator according to the invention particularly illustrating the details of the conical member and the air flow according to the present invention.
Figure 3:
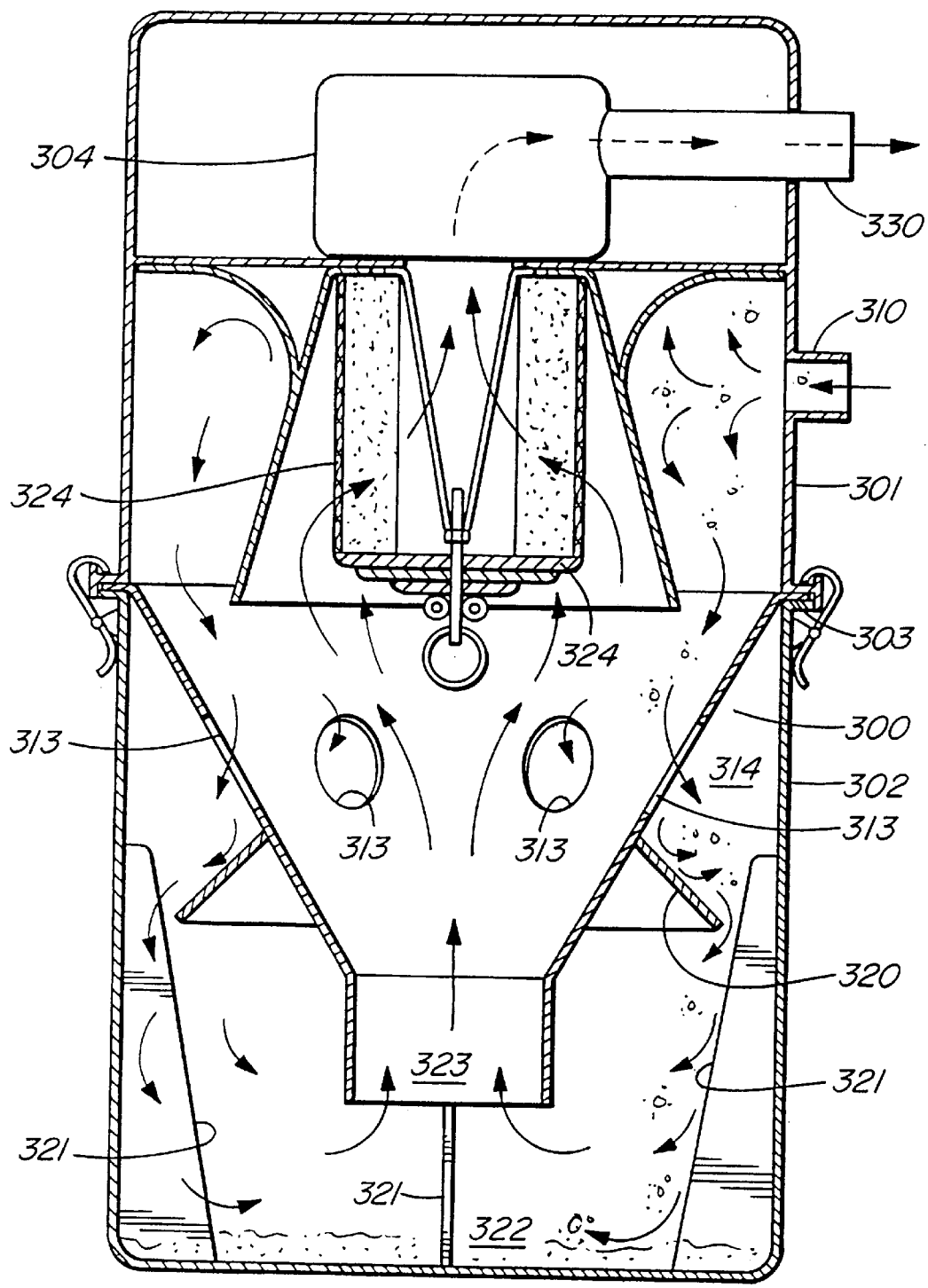
FIG. 3 is a diagrammatic cross-sectional view of a second embodiment of the cyclone generator according to a further aspect of the invention.

Reference is now made to FIG. 2 where the cyclone generator according to the present invention is generally illustrated at 200. An air inlet 201 brings in ambient air laden with vacuumed debris due to the action of a motor and impeller (not shown) similar to the motor and impeller of the prior art illustrated in FIG. 1. A filter shroud 202 is located outside an air filter generally illustrated at 203. The air filter 203 is conveniently a two stage filter 203 as is illustrated in FIG. 2 or a single stage filter 324 as illustrated in FIG. 3. Filter shroud 202 is in a conical configuration and extends outwardly with an increasing diameter in the upper casing 204 as the air moves downwardly to form a first transition area. Air filter 203 is conveniently of the two stage configuration with a first outer stage 210, the circumference through which the air first travels and a second inner stage 211 through which the air leaving the first outer stage 210 will then travel. The central area 212 of the air filter 203 is closed to prevent the entry of air into the central area of filter 203 without traveling through the outer circumference of first outer stage 210.

A second conical member 213 is mounted on the connection circumference area 214. It has a reduction in diameter as the air moves downwardly within the lower casing 215 and a transition area is also located at this point.

A truncated cone 213 is positioned in the central area of the upper and lower casings 204, 215 and is separated from the second conical member 220 by thin strut members 216 connected between truncated cone 220 and second conical member 213, the struts 216 being located intermittently about the circumference of truncated cone 220. A third conical vector member 221 is located below second conical member 213. Third conical member 221 increases in diameter as the air moves downwardly in the lower casing 215 and is connected to truncated cone 220 using plastic cement or the like or is simply integral and molded with the truncated cone 220. A transition area is formed where the third conical member 221 terminates.

A plurality of flutes 222, conveniently four(4) or five(5), are positioned on the inside circumference of the lower casing 215 at equal distances around the inside of the lower casing 215. Flutes 222 are intended to slow down the air traveling in the cyclonic configuration, thereby to lower the pressure difference and enhance debris deposition.

OPERATION

In operation, the operator will initiate operation of the motor (not shown) connected to the impeller member which will then commence to generate suction within the upper and lower casings 204, 215 (FIG. 2) comprising the cannister. A vacuum hose (not shown) operably connected to the inlet 201 of the upper casing 204 will bring air into the upper casing 204, the air being laded with debris, dust and like substances which are picked up by the suction in the vacuum hose.

As the air enters the inlet 201, it will encounter filter shroud 202 in the form of a first cone and commence to spin about the outside of the filter shroud 202. This is the first stage of the whirling or cyclonic action. As the air moves downwardly about the filter shroud 202 it will reach the bottom of the filter shroud 202 at a transition area and will be pressure deflected by second conical member 213. A high pressure zone is created at this transition area. The air will pass downwardly between second conical member 213 and truncated cone 220 until it exits the annulus and encounters third conical member 221. This defines another transition area with higher air pressure. The air pressure increases as the air travels downwardly as it spins on third conical member 221. When the air leaves the third conical member 221 at a further transition area, a low air pressure area allows the debris within the air to be deposited in the lower casing 215. Flutes 222 enhance the lowering of pressure in the spinning air and assist the deposit of debris in the lower casing 215.

The cleaner air then flows upwardly through the bottom 223 of truncated cone 220 and because the central area 212 of filter 203 is closed with a plate like member 224, the air will flow through the outer circumference of filter 203 initially through the first stage 230 and thence through second stage 231 of filter 203. When the air exits the second stage 231 of filter 203, it enters the central area of the fan impeller (not shown) and is exhausted to the atmosphere from the outlet (not shown).

A second embodiment of the invention is illustrated in FIG. 3. In this embodiment, the cyclonic generator is generally illustrated at 300 and includes a cannister comprising upper casing 301 and lower casing 302 which are connected together at joint 303. A motor (not shown) powers an impeller type fan 304 which provides suction for the air which enters the cyclone generator 300 through inlet 310. A filter shroud 311 in an outwardly expanding conical configuration is provided similar to the corresponding member in the FIG. 2 embodiment. However, a truncated cone 312 is provided which connects directly to joint 303 without being separated a distance therefrom and, accordingly, there is no annular space between the truncated cone 312 and the inside of lower casing 302 as was the case with the FIG. 2 embodiment. The truncated cone 312 of FIG. 3, however, has ovoid positioned holes or openings 313 located intermittently about the circumference of the truncated cone 312 which allow communication between the inner area of truncated cone 312 and the area 314 outside the truncated cone 312 and inside the lower casing 302 as is illustrated.

A further conical member 320 is positioned on the outside of truncated cone 312 of FIG. 3 in a manner similar to the FIG. 2 embodiment. Likewise, flutes 321 are formed about the inner circumference of casing 302.

In operation, debris laden air will enter the inlet 310 and travel downwardly outside filter shroud 311 until it reaches the truncated cone 312 where it will spin about the inside of cone 312. The communication of the high pressure air within the truncated cone 312 with the outside of truncated cone 312 by way of air holes or openings 313 will allow a low pressure area to be created in areas 314, 322 which will allow the debris from the spinning air to be deposited in the lower casing 302. The air will move upwardly from the areas 314, 322 through the central area 323 of the truncated cone 312, through the circumference of the one(1) or two(2) stage air filter 324 and out of the exhaust outlet 330 as is illustrated by the arrows.

Although only single vacuum hose inlets 201, 310 have been illustrated, the enhanced cyclonic action provided by the cyclonic generator according to the invention is contemplated to provide for an additional hose inlet or hose inlets which inlets could be used concurrently because of the strength of the suction generated.

It will be noted that the entire outside circumference of the air filters 203, 324 in the embodiments of FIGS. 2 and 3 is available for allowing air to enter the filters. The circumference utilises a spaced pleated filter material. The air is not restricted to narrow entry slits which act to limit the suction available to the user.

Figure 4A:
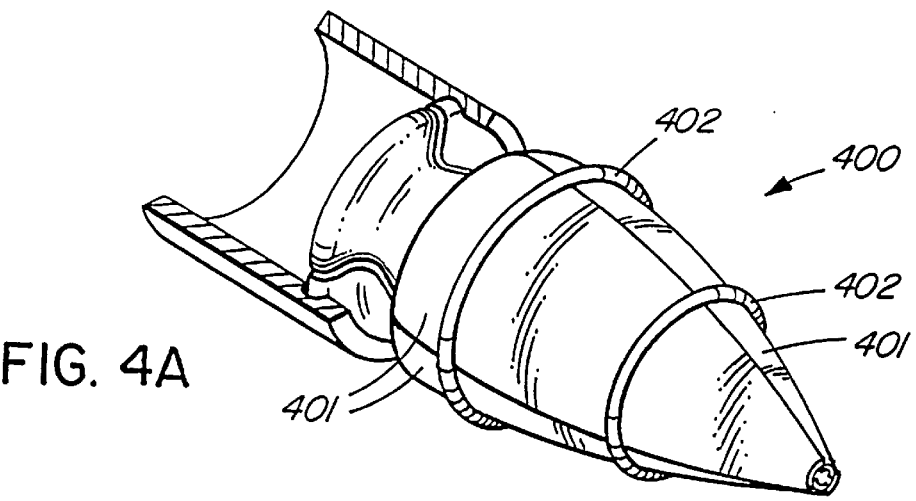
FIGS. 4A, 4B and 4C are diagrammatic isometric views of a reed tulip valve used in the cyclonic generators of FIGS. 2 and 3.
Figure 4B:
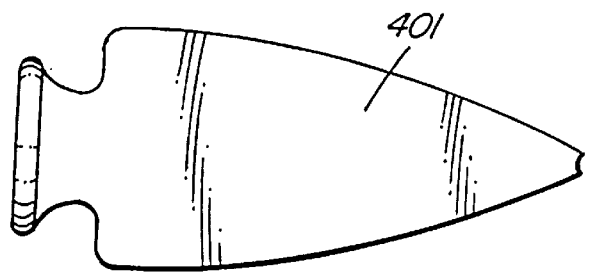
Figure 4C:
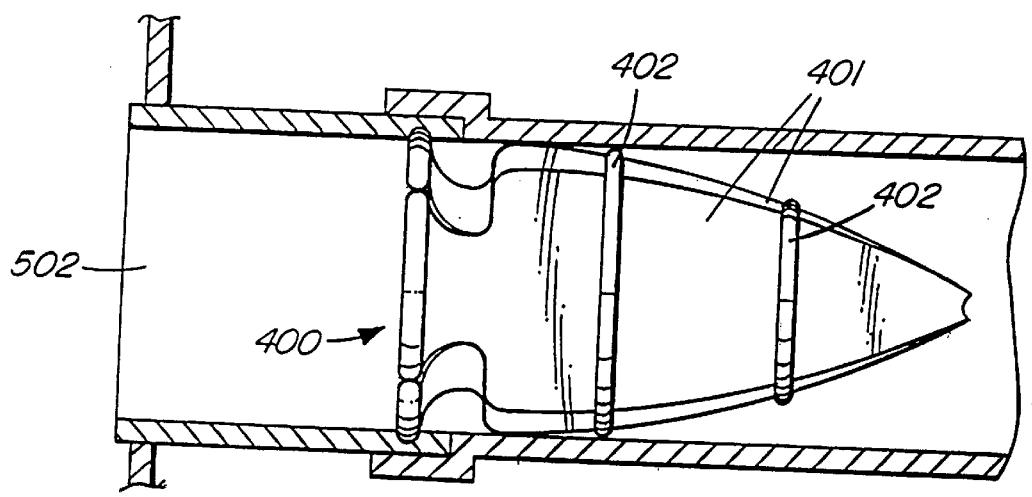

A reed value according to a further aspect of the invention is illustrated generally at 400 in FIGS. 4A, 4B and 4C. Reed valve 400 is of the self-closing type and one valve 400 is positioned in each of the air inlets 201, 310 and, conveniently, in home piping utility inlets. Tulip reed valve 400 includes a plurality of members or "reeds" 401 which are generally maintained closed by use of a coil spring 402 about the circumference of the reed valve 400 which maintains closing pressure on each of the reeds 401. When, however, a vacuum is generated and the inlet is open to air flow, the entering air will force the reeds 401 open against the closing pressure of spring 402, allow full entry of the debris laden air caused by the suction of the fan impeller 304 and equalise the vacuum in the event two(2) or more hoses are connected to the air inlets simultaneously.

It will also be noted that both embodiments of the invention are operable for use in either clockwise or counterclockwise air flow within the cannister of the cyclonic generator.

Various further modifications will readily occur to those skilled in the art to which the invention relates and the specific embodiments here described should be taken as illustrative of the invention only and not as limiting its scope as defined in accordance with the accompanying claims.

What is claimed is:

1. A vacuum system comprising:
   (a) a casing having a bottom portion, an inlet disposed above said bottom portion for receiving a flow of air and debris, and an outlet disposed downstream of said inlet;
   (b) impelling means for impelling said flow from said inlet to said outlet;
   (c) first redirection means, disposed downstream from said inlet, for redirecting said flow outwardly and downwardly within said casing;
   (d) second redirection means, disposed downstream from said first redirection means, for directing said flow inwardly and downwardly within said casing toward said casing bottom portion, in an annulus configuration of decreasing diameter as the flow proceeds.

2. The system of claim 1, further comprising retarding means disposed on the inner periphery of said casing bottom portion for retarding said flow.

3. The system of claim 2, wherein said retarding means is a vane extending radially inwardly from the inner periphery of said casing bottom portion.

4. The system of claim 1, wherein said first redirection means has a conical shaped surface impacting said flow and said first surface expands downwardly.

5. The system of claim 4, wherein said second redirection means has a conical shaped surface impacting said flow and said second surface converges downwardly.

6. The system of claim 5, further comprising filter means, disposed immediately upstream before said outlet, for filtering within said flow, the debris from the air.

7. The system of claim 5, further comprising third redirection means, disposed downstream from said second redirection means, for directing said flow outwardly and downwardly.

8. The system of claim 7, wherein said third redirection means has a conical shaped surface and said third surface diverges downwardly.

9. The system of claim 1, wherein said second redirection means has an opening for said flow to pass through downwardly to said casing bottom portion.

10. The system of claim 1, further comprising a tulip-valve disposed in said inlet which is biased to close in the absence of said flow.

* * * * *